S. PEATFIELD
Car Spring.

No. 21,624.

Patented Sept. 28, 1858.

UNITED STATES PATENT OFFICE.

S. PEATFIELD, OF IPSWICH, MASSACHUSETTS.

INDIA-RUBBER CAR-SPRINGS.

Specification of Letters Patent No. 21,624, dated September 28, 1858.

*To all whom it may concern:*

Be it known that I, SANFORD PEATFIELD, of Ipswich, in the county of Essex and State of Massachusetts, have invented a new and useful Improvement in Vulcanized-Rubber Railroad-Car Springs; and I do hereby declare that the following is a full, clear, and exact description of the same, reference being had to the accompanying drawings, making a part of this specification.

Figure 1:
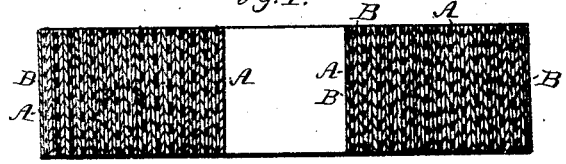
Figure 2:
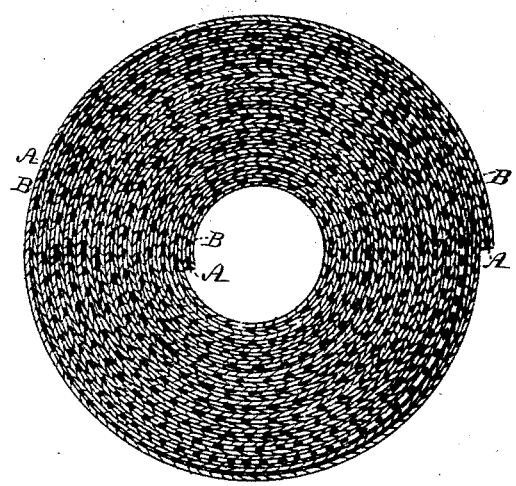

Figure 1, is a vertical section of a portion of a spring formed after the improved manner. Fig. 2, is a horizontal section or top view of the same.

Similar letters in the figures refer to corresponding parts.

Before stating the nature of my invention I deem it proper to remark that it is a well established fact that a knit fabric covered with rubber will "yield" or "give" and spring out in any direction, to the same extent and in the same manner as a knit stocking. It is also an established fact that a woven fabric covered with rubber on both sides will not thus yield, but remain unalterably of the same dimensions in which they were originally made.

The nature of my invention consists in the application of the knit fabric, covered with rubber on both sides, in the construction of a car spring, in the following manner, to wit; the combination knit and rubber fabric being wound tightly in several layers around a central axis or "former," or placed flatwise, layer upon layer, over the shaft or axis and afterward pressed and acted upon by heat until it becomes a nearly compact or united, universally yielding mass suitable for car springs. A car spring thus constructed can be graduated to any required degree of elasticity by adjusting the drawing rollers by screws so as to exert more or less tension upon the fabric as it is being wound around the central axis or "former." And the fabric formed after my invention may be subjected to a severe pressure in a powerful press or vise without involving the necessity of surrounding the roll with an iron band to prevent lateral bulging, as is indispensably necessary in the construction of solid rubber springs; this advantage resulting from the combination knit and rubber fabric yielding in all directions, while the combination canvas or woven and rubber fabric yields only in one direction.

To enable others skilled in the art to make and use my invention I will proceed to describe its construction and operation.

The knit webbing A, is composed of any desired strong material, and after being cut to the proper width, to correspond with the thickness it is desired to make the spring, is saturated and coated with india rubber, and while in an adhesive state is wound on a mandrel in the helical or spiral form represented in the drawings, in such a manner as to enable the coating bodies B, of india rubber thus interposed between the surfaces of the webbing, to firmly attach themselves together when vulcanized. and the whole to form a compact and solid body, similar to the scroll wove webbing rubber springs, heretofore employed. Above and below this compact body, are secured circular plates, equal in diameter to the same so as to entirely embrace and compress it between their surfaces when pressure is exerted thereon, and having openings in their centers for enabling them to move freely up and down over the mandrel, in precisely the same manner as the circular metallic plates interposed between rubber disks, or arranged on top of scroll webbing rubber springs, now in use.

By constructing springs of knit webbing prepared as described, and wound helically or spirally to form a compact mass, an up and down elasticity will not only be obtained, but also a horizontal bulging out or yielding of the spring will be permitted, which will render its elasticity more uniform throughout its body,—the peculiar form of the threads in knit fabrics being such as to enable this kind of webbing to stretch in every direction, while the warp and filling of woven fabrics are such as to make them rigid, and to prevent this desirable characteristic.

I am aware that vulcanized india rubber car springs have before been formed, by winding a thin sheet of prepared india rubber or woven webbing prepared with india rubber, on a mandrel in the form of a scroll while in a green state, as it comes from the heated calendering cylinders; and therefore I do not lay claim to a spring thus formed of prepared woven webbing, but What I do claim as my invention and desire to secure by Letters Patent, is, The application, in the construction of car springs, of the combination knit and rubber fabric specified, in the following manner, to wit; the combination knit and rubber fabric being wound in several layers tightly around a central axis or "former" or placed flatwise, layer upon layer over the axis or former and afterward pressed and acted upon by heat until it becomes a compact, or united, universally yielding mass, substantially as and for the purposes set forth.

SANFORD PEATFIELD.

Witnesses:
 JOHN WORTH,
 F. H. WADE.